United States Patent
Dennistoun (10) Patent No.: US 6,196,261 B1
(45) Date of Patent: Mar. 6, 2001

(54) FLAPPER VALVE ASSEMBLY WITH SEAT HAVING LOAD BEARING SHOULDER

(75) Inventor: Stuart M. Dennistoun, Carrollton, TX (US)

(73) Assignee: Halliburton Energy Services, Inc., Dallas, TX (US)

( * ) Notice: Subject to any disclaimer, the term of this patent is extended or adjusted under 35 U.S.C. 154(b) by 0 days.

(21) Appl. No.: 09/309,716

(22) Filed: May 11, 1999

(51) Int. Cl.[7] .............................. F16K 15/03; E21B 34/10
(52) U.S. Cl. .............. 137/527; 137/516.25; 137/516.27; 251/63.4; 251/334; 166/325; 166/332.8
(58) Field of Search ........................ 137/516.25, 516.27, 137/527; 166/319, 321, 322, 332.8, 325; 251/63.4, 334

(56) References Cited

U.S. PATENT DOCUMENTS

| | | | |
|---|---|---|---|
| 2,744,539 | 5/1956 | Jones | 137/527.4 |
| 3,955,623 | * 5/1976 | Aumann | 251/63.4 |
| 4,583,596 | 4/1986 | Davis | 166/332 |
| 4,674,575 | * 6/1987 | Guess | 137/516.29 |
| 4,926,945 | 5/1990 | Pringle et al. | 166/321 |
| 5,125,457 | 6/1992 | Meaders | 166/322 |
| 5,137,089 | 8/1992 | Smith et al. | 166/321 |
| 5,159,981 | * 11/1992 | Le | 137/527 |
| 5,263,847 | 11/1993 | Akkerman et al. | 251/303 |
| 5,323,859 | 6/1994 | Smith et al. | 166/321 |
| 5,682,921 | 11/1997 | Rawson et al. | 137/527.6 |
| 5,884,705 | 3/1999 | Hill, Jr. | 166/324 |

* cited by examiner

Primary Examiner—Gregory L. Huson
Assistant Examiner—Ramesh Krishnamurthy
(74) Attorney, Agent, or Firm—Paul I. Herman; Lawrence R. Youst (57) ABSTRACT

A flapper valve assembly (120) for controlling fluid flow therethrough is disclosed. The flapper valve assembly (120) comprises a tubular valve housing having a valve chamber. A valve seat (124) is mounted within the housing. The valve seat (124) has a valve seat sealing surface (126). The valve seat (124) also has an internal load bearing shoulder (134). A flapper closure plate (122) is rotatably disposed within the valve chamber. The flapper closure plate (122) is rotatable between a valve open position in which the flapper closure plate (122) is removed from the valve seat (124) and a valve closed position in which the sealing surface (128) of the flapper closure plate (122) sealingly engages the valve seat sealing surface (126) for preventing flow through the flapper valve assembly (120). The maximum travel of the flapper closure plate (122) in the closed position is defined by the internal load bearing shoulder (134) of the valve seat (124).

16 Claims, 6 Drawing Sheets

FLAPPER VALVE ASSEMBLY WITH SEAT HAVING LOAD BEARING SHOULDER

TECHNICAL FIELD OF THE INVENTION

This invention relates in general to subsurface safety valves and, in particular, to a subsurface safety valve that includes a flapper closure plate for controlling fluid flow therethrough having a maximum travel position defined by a load bearing shoulder of the flapper seat.

BACKGROUND OF THE INVENTION

Without limiting the scope of the invention, the background will describe surface controlled, subsurface safety valves, as an example.

Surface controlled, subsurface safety valves are commonly used to shut in oil and gas wells in the event of a failure or hazardous condition at the well surface. Such safety valves are typically fitted into the production tubing and operate to block the flow of formation fluid upwardly therethrough. The subsurface safety valve provides automatic shutoff of production flow in response to a variety of out of range safety conditions that can be sensed or indicated at the surface. For example, the safety conditions include a fire on the platform, a high or low flow line temperature or pressure condition or operator override.

During production, the subsurface safety valve is typically held open by the application of hydraulic fluid pressure conducted to the subsurface safety valve through an auxiliary control conduit which extends along the tubing string within the annulus between the tubing and the well casing. Flapper type subsurface safety valves utilize a closure plate which is actuated by longitudinal movement of a hydraulically actuated, tubular piston. The flapper valve closure plate is maintained in the valve open position by an operator tube which is extended by the application of hydraulic pressure onto the piston. A pump at the surface pressurizes a reservoir which delivers regulated hydraulic control pressure through the control conduit. Hydraulic fluid is pumped into a variable volume pressure chamber and acts against the crown of the piston. When, for example, the production fluid pressure rises above or falls below a preset level, the control pressure is relieved such that the piston and operator tube are retracted to the valve closed position by a return spring. The flapper plate is then rotated to the valve closed position by a torsion spring or tension member.

In conventional subsurface safety valves of the type utilizing an upwardly closing flapper plate, the flapper plate is seated against an annular sealing face, either in metal-to-metal contact or metal against an annular elastomeric seal. In one design, the flapper closure plate has a flat, annular sealing face which is engagable against a flat, annular valve seat ring, with sealing engagement being enhanced by an elastomeric seal ring which is mounted on the valve seat. In another design, the valve seat includes a downwardly facing, conical segment having a sloping sealing surface and the flapper closure plate has a complementary, sloping annular sealing surface which is adapted for surface-to-surface engagement against the conical valve seat surface.

Typically, the flapper closure plate is supported for rotational movement by a hinge assembly which includes a hinge pin and a torsion spring or tension member. It will be appreciated that structural distortion of the flapper valve closure plate, or damage to the hinge assembly which supports the flapper closure plate, can cause misalignment of the respective sealing surfaces, thereby producing a leakage path through the safety valve.

Such misalignment will prevent correct seating and sealing of the flapper closure plate, and a large amount of formation fluid may escape through the damaged valve, causing waste and pollution. During situations involving damage to the wellhead, the well flow must be shut off completely before repairs can be made and production resumed. Even a small leak through the flapper safety valve in a gas well can cause catastrophic damage.

Attempts have been made to overcome this misalignment problem. For example, one design involves the use of a valve seat and an upwardly closing flapper plate each having a sealing surface with a matched spherical radius of curvature. That is, the valve seat is a concave spherical segment and the sealing surface of the flapper plate is a convex spherical segment. In this arrangement, the spherical radius of curvature of the concave valve seat spherical segment is matched with the spherical radius of curvature of the convex spherical segment which defines the sealing surface on the flapper plate. The matching spherical surfaces are lapped together to provide a metal-to-metal seal along the interface between the nested convex and concave sealing surfaces.

As such, the convex spherical sealing segment of the flapper plate is received in nesting engagement within the concave spherical segment surface of the valve seat, which allows some angular displacement of the flapper plate relative to the valve seat without interrupting surface-to-surface engagement therebetween. Thus, the concave spherical seating surface of the safety valve seat will tolerate a limited amount of misalignment of the flapper plate which might be caused by structural distortion of the closure plate or warping of the hinge assembly.

It has been found, however, the even when using spherical sealing surfaces leakage may occur. Specifically, applications using large diameter tubing and having a low ratio between the outer diameter and the inner diameter of the sealing surfaces, distortion of the flapper closure plate caused by increased loads on the flapper closure plate may result in a loss of the seal. These increased loads are developed as a consequence of using larger safety valves having larger flapper closure plates in larger tubing.

Therefore, a need has arisen for a flapper valve that maintains a seal in a well requiring a large diameter flapper valve having a low ratio between the outer diameter and the inner diameter of the sealing surfaces. A need has also arisen for such a flapper valve that does not experience a loss of the seal in response to distortion of the flapper closure plate caused by the increased loads associated with such designs.

SUMMARY OF THE INVENTION

The present invention disclosed herein comprise a flapper valve that maintains a seal in a well requiring a large diameter flapper valve having a low ratio between the outer diameter and the inner diameter of the sealing surfaces. The flapper valve of the present invention does not experience a loss of the seal in response to distortion of the flapper closure plate caused by the increased loads associated with such applications.

The flapper valve assembly of the present invention comprises a tubular valve housing having a valve chamber. A valve seat is mounted within the housing. The valve seat has an internal load bearing shoulder or surface. A flapper closure plate is disposed within the valve chamber and rotates between a valve open position, in which the flapper closure plate is removed from the valve seat, and a valve closed position, in which the sealing surface of the flapper closure plate sealingly engages the valve seat sealing surface for preventing flow therethrough. When the flapper closure plate is in the valve closed position, the internal load bearing shoulder of the valve seat defines the maximum travel of the flapper closure plate.

The internal load bearing shoulder may be machined as an integral part of the valve seat. Alternatively, the valve seat of the flapper valve assembly of the present invention may include a seal ring insert. The seal ring insert may comprise a material having a hardness greater than that of the valve seat. The seal ring insert may be a solid ring. Alternatively, the seal ring may be a machined weld bead. In either case, the seal ring insert forms a portion of the valve seat sealing surface and the internal load bearing shoulder.

The flapper valve assembly of the present invention may, in addition to having the internal load bearing shoulder or as an alternative to having the internal load bearing shoulder, utilize a valve seat having an external load bearing surface. In this embodiment, the flapper closure plate includes a ballast member extending from the end of the flapper closure plate opposite the pivot pin, such that the external load bearing surface of the valve seat and the ballast member of the flapper closure plate defines the maximum travel of the flapper closure plate.

The flapper valve assembly of the present invention may, for example, be incorporated into a subsurface safety valve that is adapted to be placed in a well tubing string to control flow therethrough. In this case, the flapper valve assembly is disposed within a housing. An operator tube is movable within the bore of the housing for controlling movement of the flapper closure plate. A tubular piston is movably mounted within the housing that is designed for longitudinal extension and retraction. The piston is coupled to the operator tube for extending the operator tube relative to the flapper closure plate so that the flapper closure plate may be operated between the valve open and valve closed positions.

BRIEF DESCRIPTION OF THE DRAWINGS

For a more complete understanding of the present invention, including its features and advantages, reference is now made to the detailed description of the invention, taken in conjunction with the accompanying drawings of which.

DETAILED DESCRIPTION OF THE INVENTION

While the making and using of various embodiments of the present invention is discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
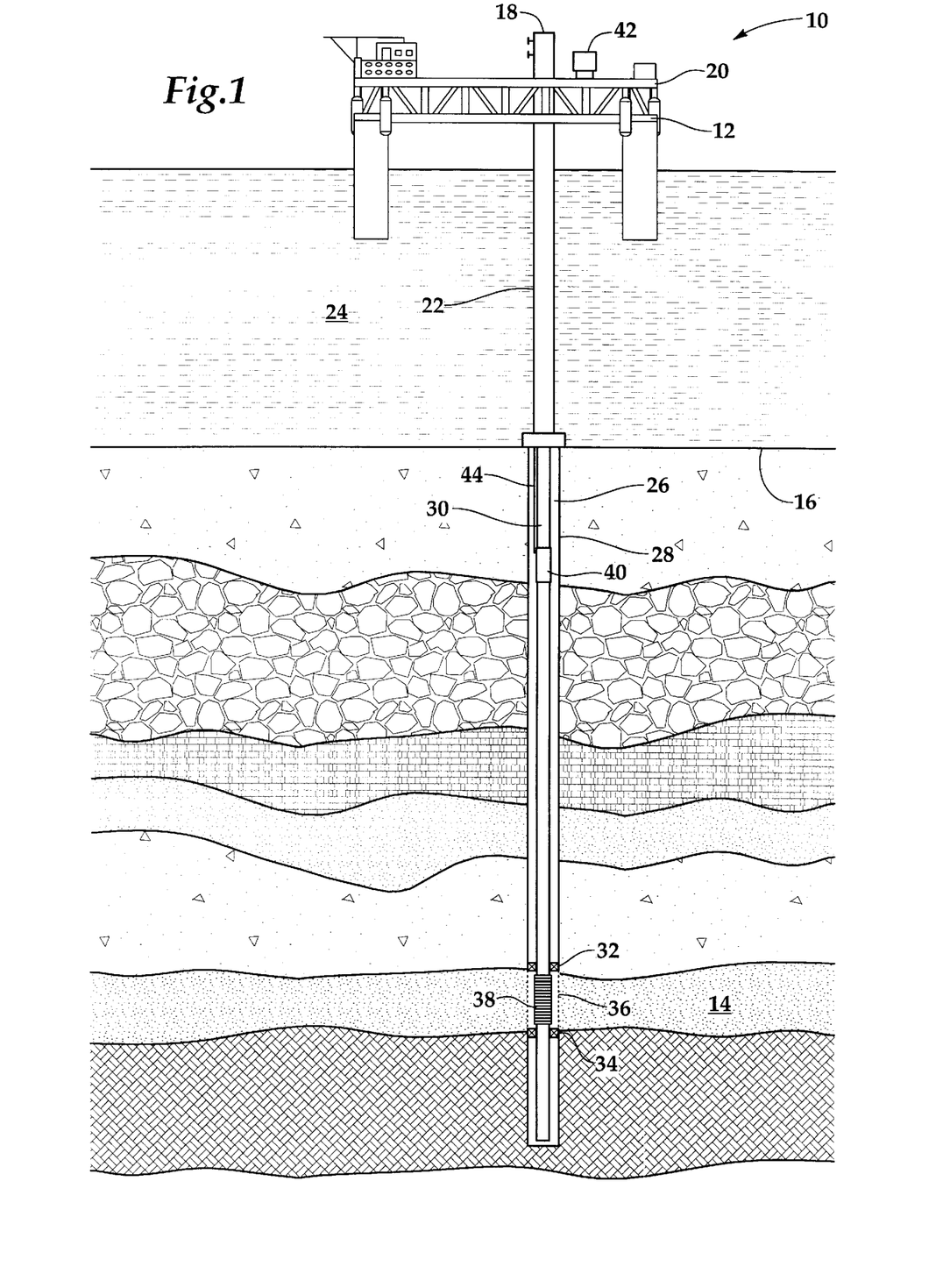
FIG. 1 is a schematic illustration of an offshore oil or gas production platform operating a subsurface safety valve of the present invention.

Referring to FIG. 1, a subsurface safety valve in use with an offshore oil and gas production platform is schematically illustrated and generally designated 10. A semi-submersible platform 12 is centered over a submerged oil and gas formation 14 located below sea floor 16. Wellhead 18 is located on deck 20 of platform 12. Well 22 extends through the sea 24 and penetrates the various earth strata including formation 14 to form wellbore 26. Disposed within wellbore 26 is casing 28. Disposed within casing 28 and extending from wellhead 18 is production tubing 30. A pair of seal assemblies 32, 34 provide a seal between tubing 30 and casing 28 to prevent the flow of production fluids therebetween. During production, formation fluids enter wellbore 26 through perforations 36 of casing 28 and travel into tubing 30 through sand control device 38 to wellhead 18. Subsurface safety valve 40 is located within the production tubing 30 and seals the wellhead 18 from the well formation 14 in the event of abnormal conditions. Subsurface safety valve 40 includes a flapper valve closure plate that, during production from formation 14, is maintained in the valve open position by hydraulic control pressure received from a surface control system 42 through a control conduit 44.

Referring now to FIGS. 2A, 2B, 3A and 3B, a subsurface safety valve 50 is illustrated. Safety valve 50 has a relatively larger production bore and is,therefore, intended for use in high flow rate wells. Safety valve 50 is connected directly in series with production tubing 30. Hydraulic control pressure is conducted in communication with a longitudinal bore 52 formed in the sidewall of the top connector sub 54. Pressurized hydraulic fluid is delivered through the longitudinal bore 52 into an annular chamber 56 defined by a counterbore 58 which is in communication with an annular undercut 60 formed in the sidewall of the top connector sub 54. An inner housing mandrel 62 is slidably coupled and sealed to the top connector sub 54 by a slip union 64 and seal 66, with the undercut 60 defining an annulus between inner mandrel 62 and the sidewall of top connector sub 54.

Figure 2A:
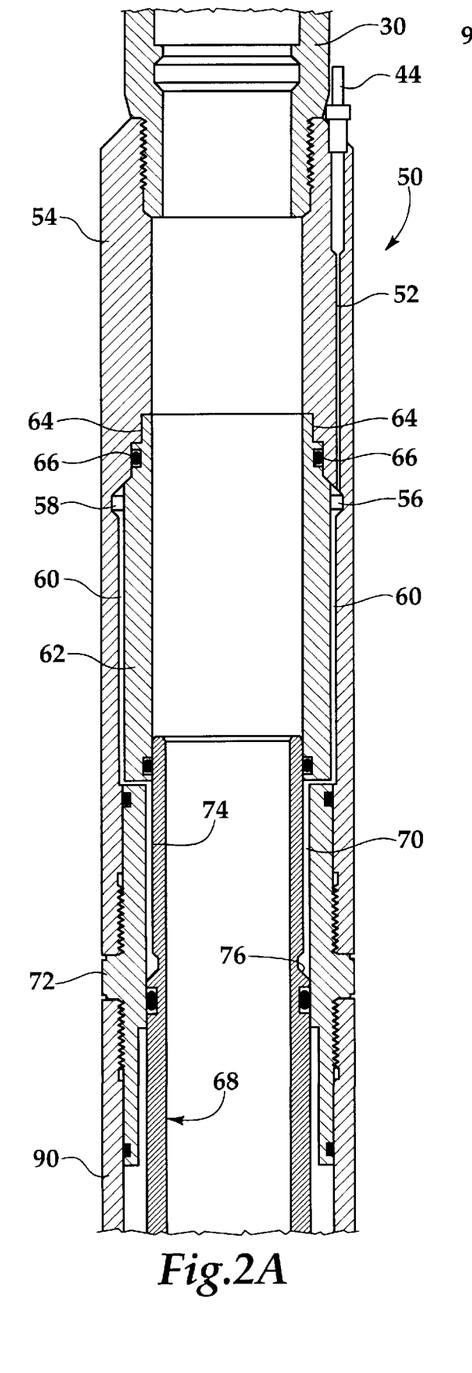
FIGS. 2A–2B are half sectional views of a subsurface safety valve of the present invention in the valve open position.
Figure 2B:
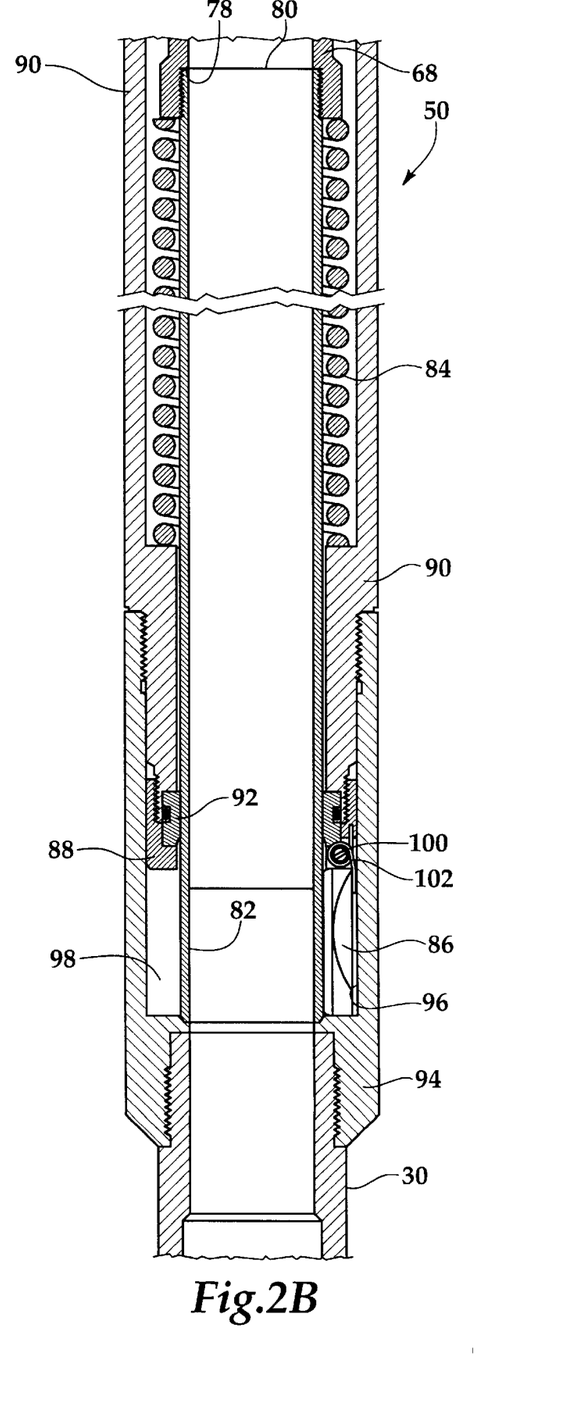

A piston 68 is received in slidable, sealed engagement against the internal bore of inner mandrel 62. The undercut annulus 60 opens into a piston chamber 70 in the annulus between the internal bore of a connector sub 72 and the external surface of piston 68. The external radius of an upper sidewall piston section 74 is machined and reduced to define a radial clearance between piston 68 and connector sub 72. An annular sloping surface 76 of piston 68 is acted against by the pressurized hydraulic fluid delivered through to control conduit 44. In FIGS. 2A–2B, piston 68 is fully extended with the piston shoulder 78 engaging the top annular face 80 of an operator tube 82. In this valve open position, a return spring 84 is fully compressed.

Figure 3A:
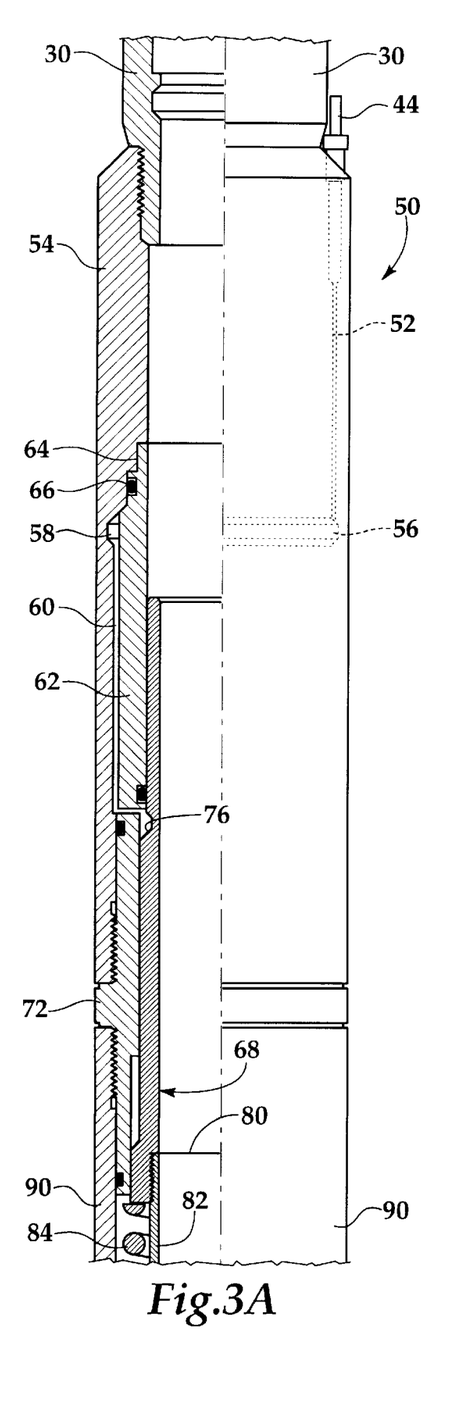
FIGS. 3A–3B are half sectional views of a subsurface safety valve of the present invention in the valve closed position.
Figure 3B:
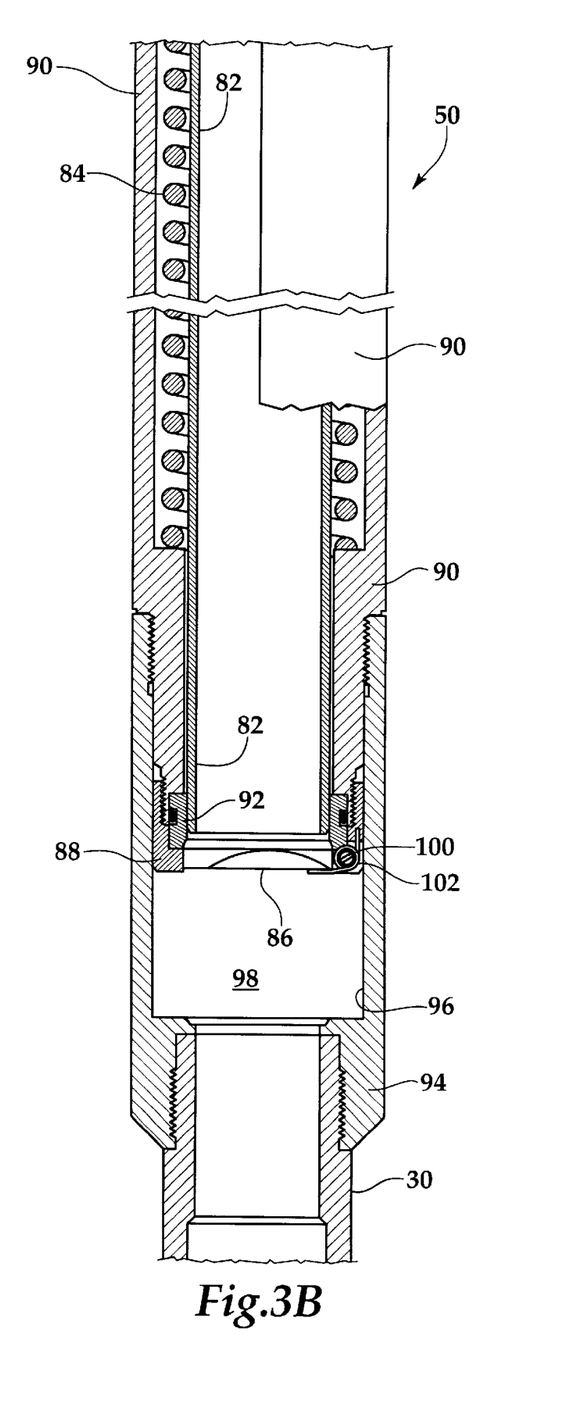

A flapper plate 86 is pivotally mounted onto a hinge sub 88 which is threadably connected to the lower end of spring housing 90. A valve seat 92 is confined within a counterbore formed on hinge sub 88. The lower end of safety valve 50 is connected to production tubing 30 by a bottom sub connector 94. The bottom sub connector 94 has a counterbore 96 which defines a flapper valve chamber 98. Thus, the bottom sub connector 94 forms a part of the flapper valve housing enclosure. Flapper plate 86 pivots about pivot pin 100 and is biased to the valve closed position as shown in FIGS. 3A–3B by coil spring 102. In the valve open position as shown in FIGS. 2A–2B, the spring bias force is overcome and flapper plate 86 is retained in the valve open position by operator tube 82 to permit formation fluid flow up through tubing 30.

When an out of range condition occurs and subsurface safety valve 50 must be operated from the valve open position to the valve closed position, hydraulic pressure is released from conduit 44 such that return spring 84 acts on the lower end of piston 68 which retracts operator tube 82 longitudinally through flapper valve chamber 98. Flapper closure plate 86 will then rotate through chamber 98. As flapper closure plate 86 nears the valve closed position within flapper valve chamber 98 where significant throttling of fluid flow occurs, the high magnitude reaction forces may distort the operator tube 82, flapper closure plate 86 or pivot pin 100. Moreover, the alignment of flapper plate 86 relative to valve seat 92 may be disturbed in response to slamming impact of flapper closure plate 86 against valve seat 92.

Figure 4:
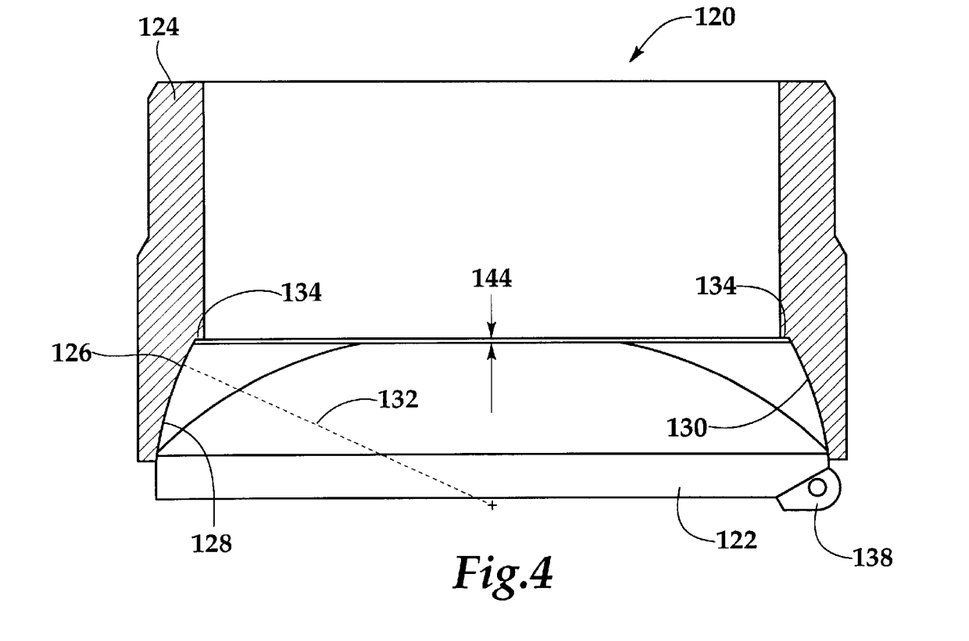
FIG. 4 is a cross sectional view of a flapper valve assembly of the present invention in the valve closed position.

Referring now to FIG. 4, a flapper valve assembly is depicted and generally designated 120. Flapper valve assembly 120 includes a flapper closure plate 122 and a valve seat 124. In the illustrated embodiment, the sealing surfaces of flapper closure plate 122 and valve seat 124 have mating segments which are matched in curvature to provide a metal-to-metal seal. Sealing surface 126 of valve seat 124 is a concave spherical segment. Sealing surface 128 of flapper closure plate 122 is a convex spherical segment. Convex flapper closure plate sealing surface 128 and concave valve seat sealing surface 126 are both generally a surface of revolution produced by revolving a semi-circular arc having an arc length 130 and radius of curvature 132. As shown in FIG. 4, the radius of curvature of convex flapper closure plate sealing surface 128 is substantially equal to the radius of curvature of concave valve seat sealing surface 126.

Specifically, the spherical radius of curvature of the concave valve seat sealing surface 126 is matched with the spherical radius of curvature of the convex flapper closure plate sealing surface 128. As used herein, "matched radius of curvature" means that the radius of curvature of the flapper plate convex sealing surface 128 is substantially the same as, but not greater than, the radius of curvature of the concave valve seat sealing surface 126. Preferably, the convex and concave surfaces are matched in curvature to provide smooth, non-binding surface engagement of convex flapper closure plate sealing surface 128 against concave valve seat sealing surface 126. The matching convex and concave spherical surfaces 128, 126 are lapped together to permit close nesting engagement of flapper closure plate 122 within valve seat 124. This arrangement permits smooth angular displacement of flapper closure plate 122 relative to valve seat 124 without interrupting surface-to-surface engagement therebetween.

Valve seat 124 includes an internal load bearing shoulder 134 extending generally radially inwardly from concave valve seat sealing surface 126. As explained in more detail below, internal load bearing shoulder 134 defines the maximum travel of flapper closure plate 122 relative to valve seat 124.

Figure 5:
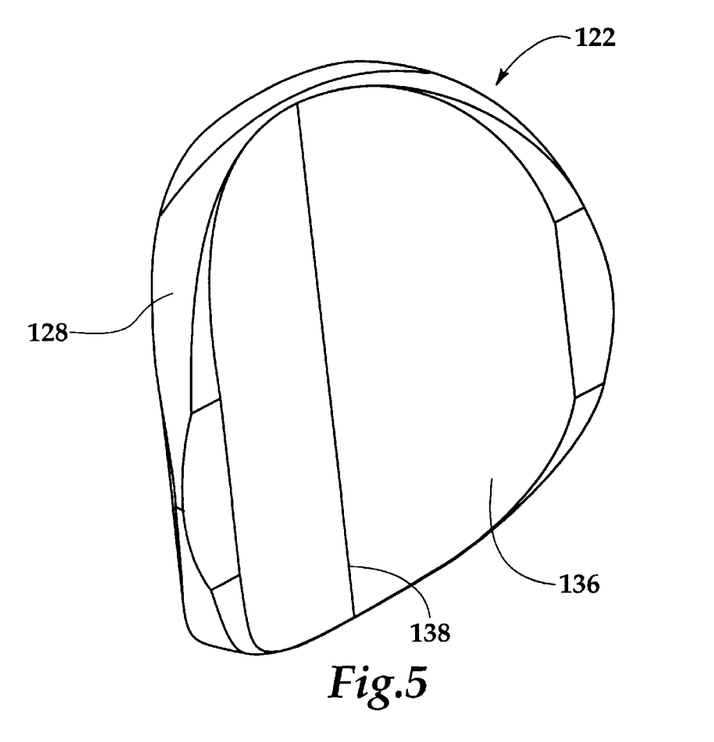
FIG. 5 is a perspective view of a flapper closure plate of a flapper valve assembly of the present invention.

Referring now to FIG. 5, flapper closure plate 122 has a convex spherical sealing surface 128 and a semi-cylindrical channel 136 across the top of flapper closure plate 122 in alignment with its longitudinal axis 138. The radial projection of flapper closure plate 122 is minimized, so that in the valve open position as shown in FIGS. 2A–2B, operator tube 82 is received within semi-cylindrical channel 136, with convex spherical sealing surface 128 projecting into the annulus between operator tube 82 and bottom sub connector 130.

Figure 6:
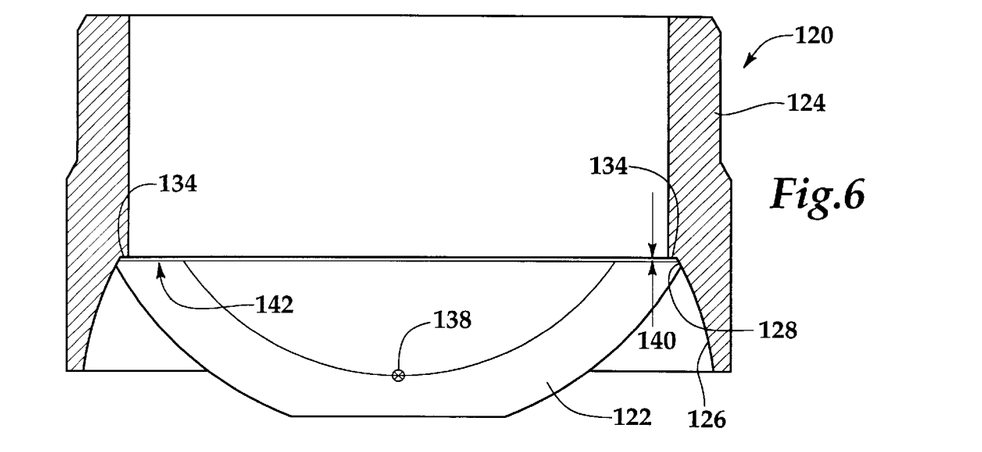
FIG. 6 is a cross sectional view of a flapper valve assembly of the present invention in the valve closed position under typical load conditions.
Figure 7:
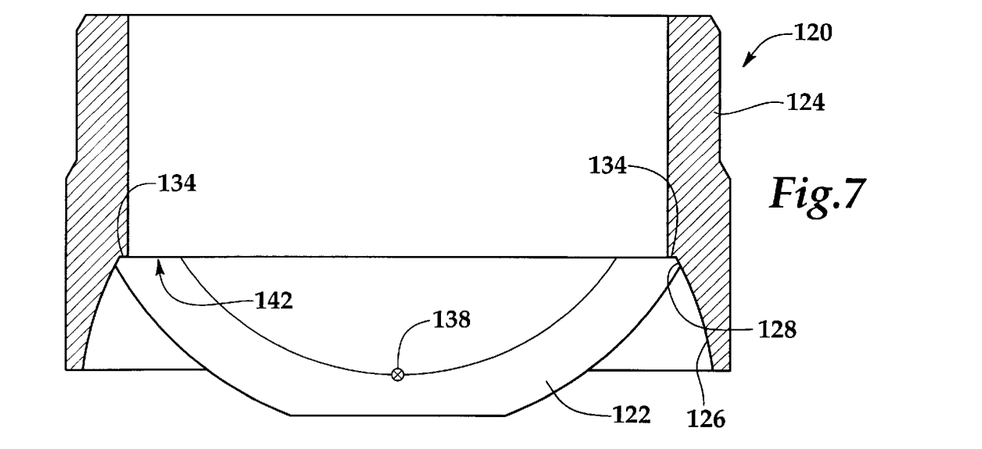
FIG. 7 is a cross sectional view of a flapper valve assembly of the present invention in the valve closed position under high load conditions.

Referring now to FIGS. 6 and 7, flapper valve assembly 120 is depicted in a view that is rotated 90 degrees from that in FIG. 4. Flapper valve assembly 120 includes flapper closure plate 122 and valve seat 124. As explained above with reference to FIG. 4, sealing surface 126 of valve seat 124 is a concave spherical segment and sealing surface 128 of flapper closure plate 122 is a convex spherical segment. Concave sealing surface 126 of valve seat 124 has a radius of curvature that is substantially equal to that of convex flapper closure plate sealing surface 128. Valve seat 124 includes an internal load bearing shoulder 134 extending generally radially inwardly from concave valve seat sealing surface 126 which defines the maximum travel of flapper closure plate 122 relative to valve seat 124.

Under typical flow rate regimes, the matching convex and concave spherical surfaces 128, 126 are lapped together to permit close nesting engagement of flapper closure plate 122 within valve seat 124 as shown in FIG. 6 wherein a gap 140 exists between the upper surface 142 of flapper closure plate 122 and internal load bearing shoulder 134 of valve seat 124. In applications where large diameter tubing and large diameter flapper closure plates are necessary and where the ratio of the outer and inner diameters of the sealing surfaces are low, the loads on flapper closure plate 122 tend to deform flapper closure plate 122 about axis 138 which may result in a loss of seal. Specifically, as flapper closure plate 122 deforms about axis 138, the seal area between flapper closure plate 122 and valve seat 124 could be reduced. As best seen in FIG. 7, internal load bearing shoulder 134 of valve seat 124 defines the maximum travel of flapper closure plate 122 such that any deformation of flapper closure plate 122 about axis 138 that closes gap 140 will not reduce the seal area between flapper closure plate 122 and valve seat 124 and will not interrupt surface-to-surface engagement between the nested spherical segments, but will merely shift the region of overlapping engagement. Consequently, a continuous, positive metal-to-metal seal is maintained completely around the spherical segment interface.

Figure 8:
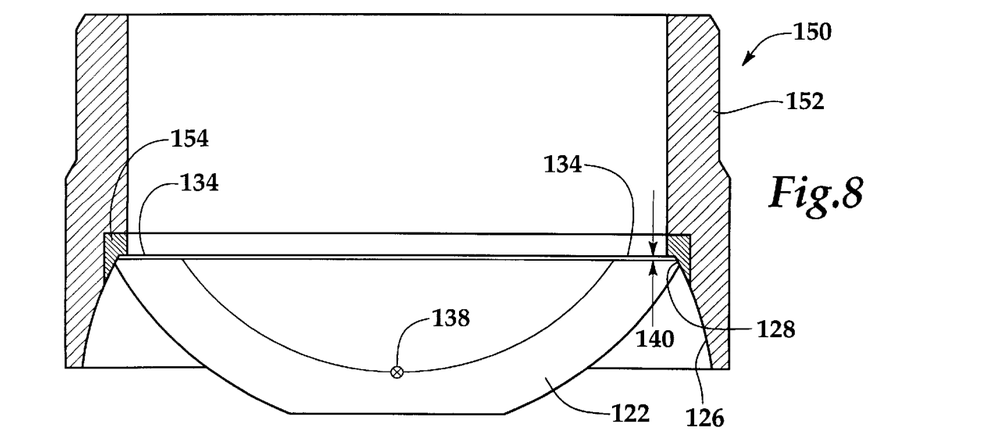
FIG. 8 is a cross sectional view of a flapper valve assembly of the present invention in the valve closed position under typical load conditions.

Referring next to FIG. 8, therein is depicted another embodiment of a flapper valve assembly of the present invention that is generally designated 150. Flapper valve assembly 150 has a flapper closure plate 122 and valve seat 152. As with flapper valve assembly 120 of FIGS. 6 and 7, flapper valve assembly 150 has concave valve seat sealing surface 126 and a convex flapper closure plate sealing surface 128. Concave sealing surface 126 of valve seat 152 has a radius of curvature that is substantially equal to that of convex flapper closure plate sealing surface 128.

Valve seat 152 includes a seal ring insert 154. Seal ring insert 154 forms a portion of concave sealing surface 126 and forms internal load bearing shoulder 134 that extends generally radially inwardly from concave valve seat sealing surface 126. Internal load bearing shoulder 134 defines the maximum travel of flapper closure plate 122 relative to valve seat 152. Preferably, seal ring insert 154 comprises a material that has a higher hardness than valve seat 152. As seal ring insert 154 must withstand extreme loads exerted by flapper closure plate 122, the hardness of seal ring insert 154 is an important feature of the present invention. For example, seal ring insert 154 may be formed by machining out a section of valve seat 152 and laying a weld bead therein. The weld bead is then machined smooth to form a portion of concave sealing surface 126 and internal load bearing shoulder 134. Alternatively, seal ring insert 154 may be a solid ring that is welded in place within valve seat 152 then machined smooth to form a portion of concave sealing surface 126 and internal load bearing shoulder 134.

Figure 9:
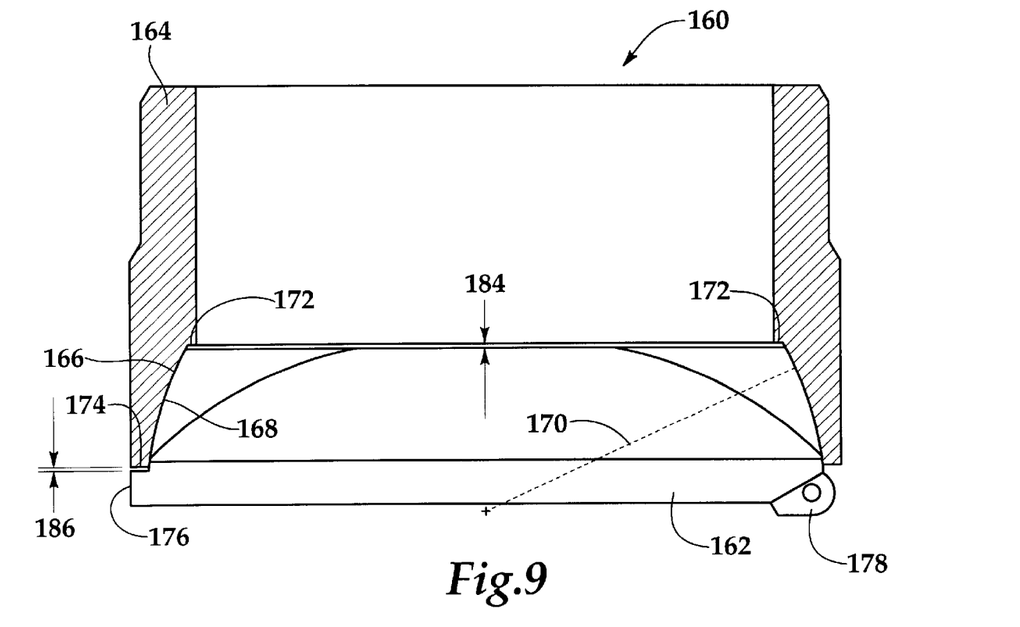
FIG. 9 is a cross sectional view of a flapper valve assembly of the present invention in the valve closed position.

Referring now to FIG. 9, a flapper valve assembly is depicted and generally designated 160. Flapper valve assembly 160 includes a flapper closure plate 162 and a valve seat 164. In the illustrated embodiment, the sealing surfaces of flapper closure plate 162 and valve seat 164 have mating segments which are matched in curvature to provide a metal-to-metal seal. Sealing surface 166 of valve seat 164 is a concave spherical segment. Sealing surface 168 of flapper closure plate 162 is a convex spherical segment. The radius of curvature 170 of convex flapper closure plate sealing surface 168 is substantially equal to the radius of curvature of concave valve seat sealing surface 166.

Specifically, the radius of curvature of the flapper plate convex sealing surface 168 is substantially the same as, but not greater than, the radius of curvature of the concave valve seat sealing surface 166. Preferably, the convex and concave surfaces are matched in curvature to provide smooth, non-binding surface engagement of convex flapper closure plate sealing surface 168 against concave valve seat sealing surface 166. The matching convex and concave spherical surfaces 168, 166 are lapped together to permit close nesting engagement of flapper closure plate 162 within valve seat 164. This arrangement permits smooth angular displacement of flapper closure plate 162 relative to valve seat 164 without interrupting surface-to-surface engagement therebetween.

Valve seat 164 includes an internal load bearing shoulder 172 extending generally radially inwardly from concave valve seat sealing surface 166. Valve seat 164 also includes an external load bearing shoulder 174 extending generally radially outwardly from concave valve seat sealing surface 166. External load bearing shoulder 174 is axially aligned with ballast member 176 of flapper closure plate 162. Ballast member 176 is integral with flapper closure plate 162 and is disposed opposite of pivot pin support member 178. Together, internal load bearing shoulder 172 and external load bearing shoulder 174 defines the maximum travel of flapper closure plate 162 relative to valve seat 124. It should be noted by those skilled in the art that even though ballast member 176 is depicted as integral with flapper closure plate 162, a ballast member could be attached to flapper closure plate 162 using a variety of methods including, but not limited to, welding.

Figure 10:
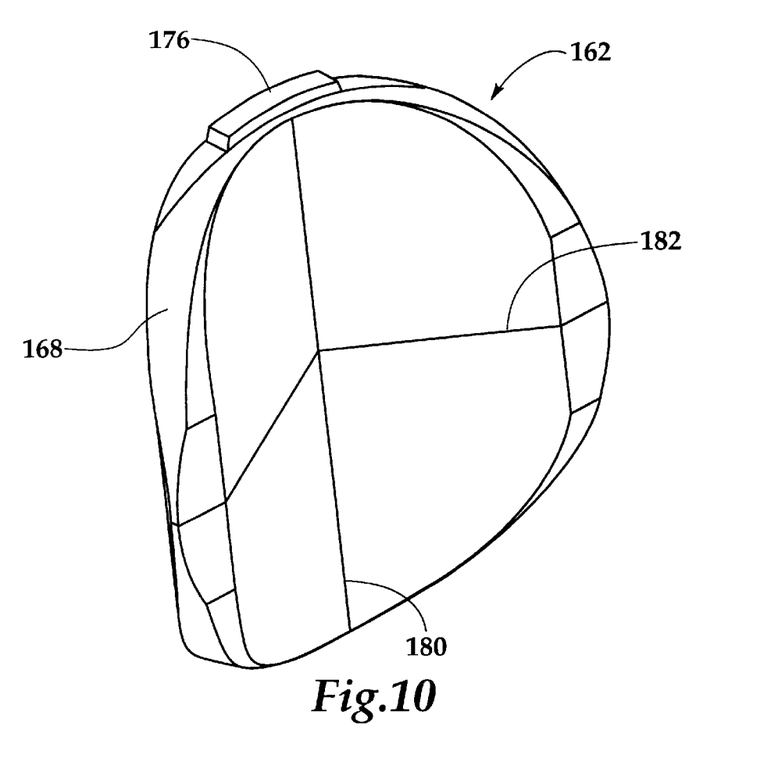
FIG. 10 is a perspective view of a flapper closure plate of a flapper valve assembly of the present invention.

In application where large diameter tubing and large diameter flapper closure plates are necessary and wherein the ratio between the outer and inner diameters of the sealing surfaces is low, the loads on flapper closure plate 162 tend to deform flapper closure plate 162 about both axis 180 and axis 182, as best seen in FIG. 10. As flapper closure plate 162 deforms about axis 180 and gap 184 is closed, internal load bearing shoulder 172 of valve seat 164 defines the maximum travel of flapper closure plate 162. Likewise, as flapper closure plate 162 deforms about axis 182 and gap 186 is closed, external load bearing shoulder 174 of valve seat 162 defines the maximum travel of ballast member 176 of flapper closure plate 162. As such, any deformation of flapper closure plate 162 about axis 180 or axis 182 will not reduce the seal area between flapper closure plate 162 and valve seat 164 and will not interrupt surface-to-surface engagement between the nested spherical segments, but will merely shift the region of overlapping engagement. Consequently, a continuous, positive metal-to-metal seal is maintained completely around the spherical segment interface.

While this invention has been described with a reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A flapper valve assembly comprising:
    a tubular valve housing having a valve chamber;
    a valve seat mounted within the housing having a valve seat sealing surface and having an internal load bearing shoulder, the valve seat defining a flow passage therethrough; and
    a flapper closure plate rotatably disposed within the valve chamber rotatable between a valve open position in which the flapper closure plate is removed from the valve seat and a valve closed position in which a sealing surface of the flapper closure plate sealingly engages the valve seat sealing surface for preventing flow through the flow passage, the internal load bearing shoulder of the valve seat defining the maximum travel of the flapper closure plate in the closed position.

2. The flapper valve assembly as recited in claim 1 further comprising a seal ring insert within the valve seat.

3. The flapper valve assembly as recited in claim 2 wherein the seal ring insert further comprises a material having a hardness greater than that of the valve seat.

4. The flapper valve assembly as recited in claim 2 wherein the seal ring insert further comprises a solid ring.

5. The flapper valve assembly as recited in claim 2 wherein the seal ring insert further comprises a machined weld bead.

6. The flapper valve assembly as recited in claim 2 wherein the seal ring insert forms a portion of the valve seat sealing surface and the internal load bearing shoulder.

7. The flapper valve assembly as recited in claim 1 wherein the valve seat further comprises an external load bearing surface, wherein the flapper closure plate further comprises a ballast member and wherein the internal load bearing shoulder of the valve seat, the external load bearing surface of the valve seat and the ballast member of the flapper closure plate define the maximum travel of the flapper closure plate in the closed position.

8. The flapper valve assembly as recited in claim 1 wherein the sealing surface of the flapper closure plate forms a convex spherical segment having radius of curvature and wherein the valve seat sealing surface forms a concave spherical segment having a radius of curvature that is substantially matched with the radius of curvature of the convex spherical segment of the flapper closure plate to permit nesting engagement of the convex spherical segment of the flapper closure plate against the concave spherical segment of the valve seat.

9. A flapper valve assembly comprising:
    a tubular valve housing having a valve chamber;
    a valve seat mounted within the housing having a valve seat sealing surface and having an external load bearing surface, the valve seat defining a flow passage therethrough; and
    a flapper closure plate rotatably disposed within the valve chamber rotatable between a valve open position in which the flapper closure plate is removed from the valve seat and a valve closed position in which a sealing surface of the flapper closure plate sealingly engages the valve seat sealing surface for preventing flow through the flow passage, the flapper closure plate having a ballast member, wherein the external load bearing surface of the valve seat and the ballast member of the flapper closure plate define the maximum travel of the flapper closure plate in the closed position.

10. The flapper valve assembly as recited in claim 9 wherein the valve seat further comprises an internal load bearing shoulder that together with the external load bearing surface define the maximum travel of the flapper closure plate in the closed position.

11. The flapper valve assembly as recited in claim 10 further comprising a seal ring insert within the valve seat.

12. The flapper valve assembly as recited in claim 11 wherein the seal ring insert further comprises a material having a hardness greater than that of the valve seat.

13. The flapper valve assembly as recited in claim 11 wherein the seal ring insert further comprises a solid ring.

14. The flapper valve assembly as recited in claim 11 wherein the seal ring insert further comprises a machined weld bead.

15. The flapper valve assembly as recited in claim 11 wherein the seal ring insert forms a portion of the valve seat sealing surface and the internal load bearing shoulder.

16. The flapper valve assembly as recited in claim 9 wherein the sealing surface of the flapper closure plate forms a convex spherical segment having radius of curvature and wherein the valve seat sealing surface forms a concave spherical segment having a radius of curvature that is substantially matched with the radius of curvature of the convex spherical segment of the flapper closure plate to permit nesting engagement of the convex spherical segment of the flapper closure plate against the concave spherical segment of the valve seat.

* * * * *